June 26, 1923.                    E. L. GOODIN                    1,459,883
AEROPLANE
Original Filed Feb. 8, 1922
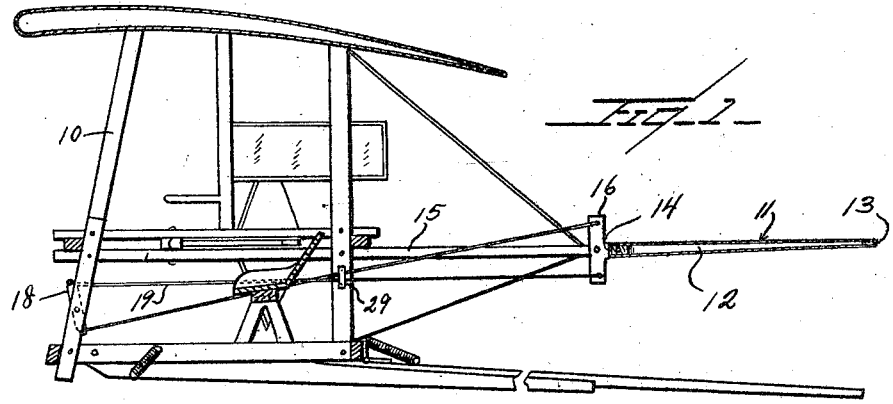
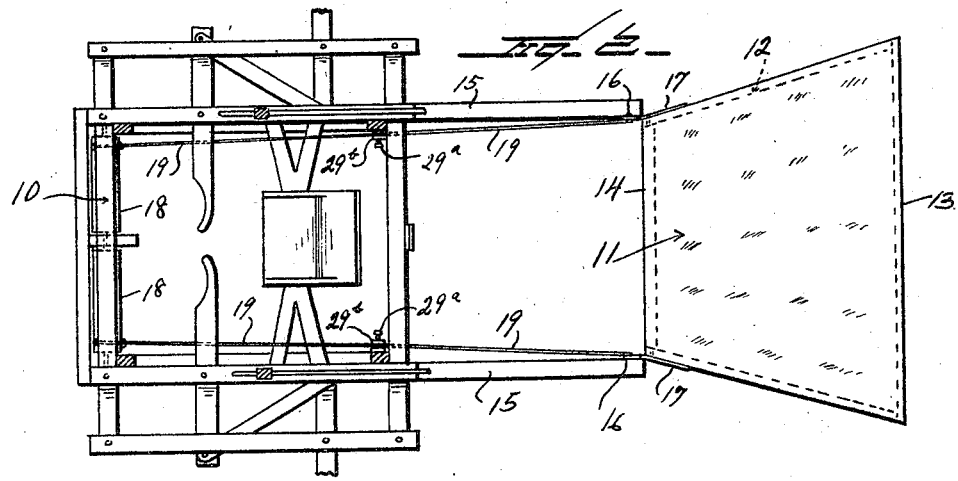
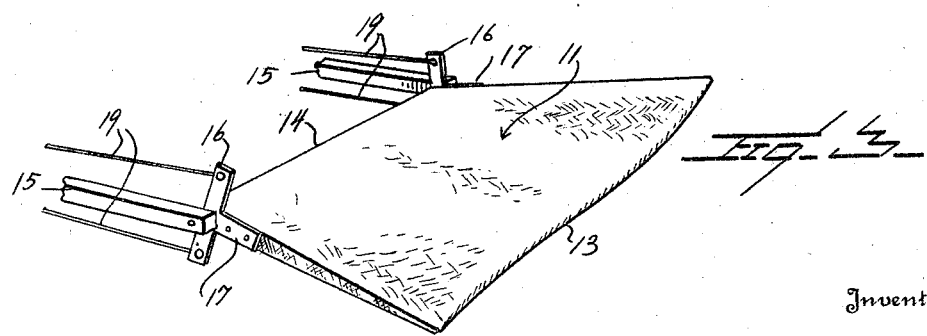
Inventor
*E. L. Goodin*
By *Watson E. Coleman*
Attorney Patented June 26, 1923.

1,459,883

UNITED STATES PATENT OFFICE.

EDWARD L. GOODIN, OF COPELAND, ARKANSAS, ASSIGNOR OF ONE-THIRD TO GEORGE B. M. WILL, OF CRABTREE, ARKANSAS.

AEROPLANE.

Original application filed February 8, 1922, Serial No. 534,946. Divided and this application filed October 28, 1922. Serial No. 597,657.

*To all whom it may concern:*

Be it known that I, EDWARD L. GOODIN, a citizen of the United States, residing at Copeland, in the county of Van Buren and State of Arkansas, have invented certain new and useful Improvements in Aeroplanes, of which the following is a specification, reference being had to the accompanying drawings.

This invention relates to improvements in aeroplanes, and more particularly to an improvement in the guiding tail structure thereof, this application forming a division of my co-pending application, Serial No. 534,946, filed February 8, 1922, for improvements in aeroplanes.

An important object of this invention is to provide a novel and improved tail structure for guiding an aeroplane or the like whereby the movement of the plane is influenced by warping the tail structure after the manner of the movement of the tail of a bird and in substantial imitation thereof.

A still further object of the invention is to provide a device of this character which is readily operated and by means of which a combined turning and banking movement of the plane may be caused.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a sectional view of an aeroplane embodying a tail structure constructed in accordance with my invention;

Figure 2 is a sectional plan showing the tail structure; and

Figure 3 is a perspective view showing the manner of warping the same to obtain banking and change of direction.

Referring now more particularly to the drawings, the numeral 10 generally designates the body or fuselage of an aeroplane and 11 the tail structure pivotally mounted at the rear end thereof. The tail structure is in the form of a horizontal frame 12 increasing in width rearwardly so that the rear edge thereof, as indicated at 13, is of considerably greater width than the forward edge 14. The connection between the front and rear cross members of the frame 12 with the side members thereof is such as to permit independent elevation of either of the side members.

The numeral 15 designates fuselage supported braces to which are centrally pivoted the head portions 16 of T-shaped control members, the leg portions 17 of which are secured to the adjacent side members of the tail structure. Within the fuselage 10 I pivotally mount a pair of control members 18 corresponding to the T-shaped control members hereinbefore described in arrangement. To these control members at opposite sides of the pivots thereof I connect control wires 19, and the rear ends of these control wires are connected to corresponding points upon the head of the T-shaped control members so that movement of the control members 18 within the fuselage about their pivots will cause a corresponding movement of the T-shaped control members upon the supports 15.

In the use of the tail structure hereinbefore described, if it is desired to bank, for example to the right in making a right turn, this may be accomplished by oscillating the right hand foot control 18 to elevate the right hand side of the flexible tail structure 11, thus tending to depress this side of the machine, or this may be accomplished by simultaneously operating the foot controls, the right hand foot control to elevate the right hand side of the tail structure and the left hand foot control to depress the left hand side. If it is desired to simultaneously bank and elevate or depress the machine, the pedals are both actuated to elevate or depress the tail as the case may be, one of the pedals being further actuated than the other to give the desired banking effect.

From the foregoing it will be obvious that the operation of the machine is under a control similarly to the manner of control employed by soaring birds, such as large hawks, eagles and buzzards. These fowls flex the tail in substantially the same manner as hereinbefore set forth during their soaring operations, heading into the current of air and obtaining an elevation desired by the manipulation of the tail. In order that the entire strain of maintaining the tail in adjusted positions may not fall upon the operator, the guides 29 are preferably in the form of spaced headed elements 29ª having a spring pressed plate 29ᵇ mounted thereon and bearing against the flexible controls 28 binding them between the plate and the associated portion of the fuselage.

From the foregoing it is believed to be obvious that a tail structure and control therefor such as described is particularly well adapted for use in that it provides a flexibility of control from the tail otherwise impossible and at the same time greatly simplifies the tail structure when compared with others now in common use. It will furthermore be obvious that the structure as hereinbefore set forth is more or less diagrammatic and capable of a large range of alteration and modification without materially departing from my invention and I accordingly do not limit myself thereto except as hereinafter claimed.

I claim:—

In an aeroplane, the combination with a warping normally horizontally disposed tail plane, of means for elevating or depressing either side of said plane embodying side members for said plane, pivoted T levers having the stems thereof secured to said side members, a pair of pivoted foot controls, flexible control elements connected at opposite sides of each of said foot controls and to the ends of the head of the T lever, and a yielding brake element engaged with each of said flexible control elements.

In testimony whereof I hereunto affix my signature.

EDWARD L. GOODIN.